US008798631B2

(12) United States Patent
Sander et al.

(10) Patent No.: US 8,798,631 B2
(45) Date of Patent: Aug. 5, 2014

(54) METHOD AND DEVICES FOR ALLOCATING BEARERS

(75) Inventors: Ann-Christine Sander, Vastra Frolunda (SE); Peter Ramle, Molnlycke (SE); Gunnar Rydnell, Vastra Frolunda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 3 days.

(21) Appl. No.: 13/544,240

(22) Filed: Jul. 9, 2012

(65) Prior Publication Data
US 2013/0012211 A1 Jan. 10, 2013

Related U.S. Application Data

(63) Continuation of application No. PCT/EP2012/063163, filed on Jul. 5, 2012.

(60) Provisional application No. 61/504,335, filed on Jul. 5, 2011.

(51) Int. Cl.
*H04W 36/14* (2009.01)

(52) U.S. Cl.
USPC .......................................... 455/438; 455/436

(58) Field of Classification Search
USPC .......... 455/436, 438; 370/230, 328, 331, 332, 370/350
See application file for complete search history.

(56) References Cited

U.S. PATENT DOCUMENTS

2012/0108240 A1* 5/2012 Liu et al. ........................ 455/436

FOREIGN PATENT DOCUMENTS

EP 2309796 A1 4/2011
WO 2010052343 A2 5/2010

OTHER PUBLICATIONS

"3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 10)", 3GPP Standard; 3GPP TR 23.885, 3rd Generation Partnership Project (3GPP), Mobile Competence Centre; 650, Route Des Lucioles; F-06921 Sophia-Antipolis Cedex; France, vol. SA WG2, No. V1.3.0, Jun. 16, 2011, pp. 1-80, XP050553147.
LG Electronics, "rSRVCC access transfer preparation #3 updates", 3GPP Draft; S2-111688 RSRVCC Access Transfer Preparation Alternative #3 Updates, 3rd Generation Partnership Project (3GPP), Mobile Competence Centre; 650, Route Des Lucioles; F-06921 Sophia-Antipolis Cedex; France, vol. SA WG2, No. Bratislava, Slovakia; Apr. 6, 2011, 4 pages.
International Search Report and Written Opinion dated Sep. 24, 2012 from corresponding International application No. PCT/EP2012/063163, 14 pages.

\* cited by examiner

*Primary Examiner* — Sam Bhattacharya
(74) *Attorney, Agent, or Firm* — Rothwell, Figg, Ernst & Manbeck, P.C.

(57) ABSTRACT

The embodiments herein relates to a method in a target Mobility Management Entity, MME, for allocating bearers in a target network, which target MME is comprised in the target network and which target network comprises a first number of existing bearers. When a second number of required bearers is larger than the first number of existing bearers in the target network, the target MME transmits an allocation request message to a target base station. The allocation request message comprises a request for allocation of the first number of existing bearers and a request for allocation of a third number of extra bearers in the target network.

58 Claims, 11 Drawing Sheets

Fig. 4 rSRVCC

Fig. 5 IRAT HO

METHOD AND DEVICES FOR ALLOCATING BEARERS

This application is a continuation of international patent application PCT/EP2012/063163, filed Jul. 5, 2012, which designates the United States and which claims priority to provisional patent application 61/504,335, filed Jul. 5, 2011. The above identified applications are incorporated by reference herein in their entirety.

TECHNICAL FIELD

Embodiments herein relate generally to a target Mobile Management Entity (MME) and a method in the target MME, a target base station and a method in the target base station and to a source network node and a method in the source network node. More particularly the embodiments herein relate to allocating bearers in a target network.

BACKGROUND

In a typical communications network, also referred to as a wireless communications system, wireless communications network, cellular network or cellular system, a user Equipment (UE), communicate via a Radio Access Network (RAN) to one or more Core Networks (CNs).

A user equipment is a device by which a subscriber may access services offered by an operators network and services outside operator's network to which the operators radio access network and core network provide access, e.g. access to the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, handheld, computer comprised, or vehicle mounted user equipments, enabled to communicate voice and/or data, via the radio access network, with another entity, such as another user equipment or a server.

User equipments are enabled to communicate wirelessly in the communications network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. evolved Node B (eNB), eNodeB, NodeB, B node, or Base Transceiver Station (BTS), depending on the technology and terminology used. The base stations communicate over the air interface operating on radio frequencies with the user equipments within range of the base stations.

The communications network may apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies such as Wireless Local Area Network (WLAN).

In for example LTE, user equipments expect a new network to support all the services from a legacy network. To meet these needs, Inter-technology mobility is an important feature. In LTE, voice service over LTE is Internet Protocol Multimedia Subsystem (IMS)-based Voice Over Internet Protocol (VoIP). LTE is a packet data network and VoIP is used for supporting voice on packet networks.

Inter-technology mobility is also important for introduction of new services. Inter-technology mobility, enables that a new service may be rolled out network-wide even though the wireless broadband access technology that best and most efficiently supports it has only been deployed in the highest traffic areas. Inter-technology mobility provides a bridge between the old and new access networks enabling seamless service continuity for the user over a wide area.

Inter-technology mobility may simplify rollout of a new LTE where voice services is moved to VoIP over IMS in conjunction with the deployment of an LTE access network by using inter-technology mobility together with a functionality called Single Radio Voice Call Continuity (SRVCC). SRVCC is an LTE functionality that allows a VoIP/IMS call in the LTE packet domain to be moved to a legacy circuit domain, e.g. GSM/UMTS or CDMA. UMTS is short for Universal Mobile Telecommunications System.

When a user equipment with an ongoing IMS voice call in LTE looses its LTE coverage, provided the 2G/3G, i.e. Circuit Switched (CS) network, does not support VoIP, the user does SRVCC to 2G/3G and continues the voice call in the CS network through a Mobile Switching Centre Server (MSC). The MSC is a 3G core network element which controls the network switching subsystem elements. When the user equipment gets back into LTE coverage, the operator may want for different reasons to move the user equipment back to LTE. That procedure is called return SRVCC (rSRVCC). Another use case for rSRVCC may also be that the user equipment was camping in 2G/3G and started a CS voice call in 2G/3G through the MSC. After some time the user equipment gets into LTE coverage, upon which the rSRVCC is triggered.

A handover of an ongoing voice call from LTE to a 3G or 2G network, or a handover of an ongoing voice call from 2G/3G to LTE is done by using a mechanism called a dedicated bearer. In general, a bearer may be a logical channel that carries some information. A bearer may also be referred to as a radio resource. One Evolved Packet System (EPS) bearer is established when the user equipment 101 connects to the Packet Data Network (PDN) and remains connected throughout the lifetime of the connection. It is also called a default bearer. A default bearer provides always-on Internet Protocol (IP) connectivity to the network. Any additional EPS bearer is called a dedicated bearer. Dedicated bearers contexts are established when a service in the network requests a prioritising of IP packets belonging to a specific media stream between two IP addresses and TCP/UDP ports. A dedicated bearer is a bearer that carries traffic for IP flows that have been identified as requiring a specific packet forwarding treatment. A dedicated bearer is request by a user equipment to transmit data with a particular Quality of Service (QoS). TCP is short for Transmission Control Protocol and UDP is short for User Datagram Protocol.

When doing handover between different radio technologies, the bearer resource demands may differ in the source and in the target systems. One example is rSRVCC. When doing rSRVCC HO from a 2G/3G CS system to a VoIP based LTE system the user equipment may have been allocated a number of Packet Switched (PS) bearers and also a Circuit Switched (CS) bearer in the source system. After HandOver (HO) to LTE, the CS bearer is not available to the user equipment. It needs to be replaced by a new PS bearer to carry the voice media. If there are no resources available in the target system, the new voice specific PS bearer may not be allocated once the user equipment has been handed over to the target system. In this case the voice call will be interrupted. Then it would have been better to interrupt the rSRVCC and let the user equipment remain in 2G/3G. This is due to that rSRVCC may be triggered from optimizations rather than from loss of radio coverage. The rSRVCC procedure does not allow check for resources in the target system for non-existing bearers, only already allocated bearers may be checked.

The existing method for rSRVCC may be performed in different ways depending on if the source system is Dual Transfer Mode (DTM) based or non-DTM. In other words it is depending on if the PS service and the CS service may be done in parallel or only one at the time. Also this procedure is not really specified completely yet in 3GPP. DTM is a protocol based on the GSM standard that allows simultaneous transfer of CS voice and PS data over the same radio channel.

The rSRVCC procedure for the non-DTM case is shown here, but the pre-allocation is also applicable to the DTM based procedure.

In the non-DTM case, the existing rSRVCC procedure is comprises the following steps, which steps may be performed in any suitable order:

Step 1

The source radio access network node triggers that handover to LTE is needed and sends a signal about this to the MSC. The source radio access network node may be for example an eNB or a Radio Network Controller (RNC) or a Base Station Controller (BSC).

Step 2

The MSC sends a CS to PS handover request to the target MME.

Step 3

The target MME request, from the source SGSN, the existing Packet data protocol (PDP) contexts, i.e. bearers.

Step 4

The MME sends a request to the eNB to allocate the bearers.

Step 5

The eNB transmits a reply to the request to the MME. The request comprises indications about result of the allocation to the MME.

Step 6

The MME sends a CS to PS acknowledgement to the MSC.

Step 7

The MSC sends a handover command to the source radio access network node, e.g. an eNB or a RNC. The handover command triggers the user equipment to move to LTE.

Step 8

When the user equipment appears in LTE, a new Guaranteed Bit Rate (GBR) bearer that may be used for voice is allocated and the voice call continues.

A disadvantage of this is that the network utilization is not optimized, and that the user equipments experience may be exposed to service interruptions.

SUMMARY

An object of embodiments herein is therefore to obviate at least one of the above disadvantages and to provide improved handover in a communications network.

According to a first aspect, the object is achieved by a method in a target MME for allocating bearers in a target network. The target MME is comprised in the target network and the target network comprises a first number of existing bearers. When a second number of required bearers is larger than the first number of existing bearers in the target network, the target MME transmits an allocation request message to a target base station. The allocation request message comprises a request for allocation of the first number of existing bearers and a request for allocation of a third number of extra bearers in the target network.

According to a second aspect, the object is achieved by a method in a target base station for allocating bearers in a target network. The target base station is comprised in the target network and the target network comprises a first number of existing bearers. When a second number of required bearers is larger than the first number of existing bearers in the target network, the target base station receives an allocation request message from a target MME. The allocation request message comprises a request for allocation of the first number of existing bearers and a request for allocation of a third number of extra bearers in the target network. The target base station allocates the first number of existing bearers and allocates the third number of extra bearers.

According to a third aspect, the object is achieved by a method in a source network node for allocating bearers in a target network. The source network node is comprised in the source network and the target network comprises a first number of existing bearers. The source network node determines a second number of required bearers in the target network for handover from the source network to the target network.

According to a fourth aspect, the object is achieved by a target MME for allocating bearers in a target network. The target MME is comprised in the target network and the target network comprises a first number of existing bearers. The target MME comprises a transmitter configured to, when a second number of required bearers is larger than the first number of existing bearers in the target network, transmit an allocation request message to a target base station. The allocation request message comprises a request for allocation of the first number of existing bearers and a request for allocation of a third number of extra bearers in the target network.

According to a fifth aspect, the object is achieved by a target base station for allocating bearers in a target network. The target base station is comprised in the target network and the target network comprises a first number of existing bearers. The target base station comprises a receiver configured to, when a second number of required bearers is larger than the first number of existing bearers in the target network, receive an allocation request message from a target MME. The allocation request message comprises a request for allocation of the first number of existing bearers and a request for allocation of a third number of extra bearers in the target network. The target base station comprises a processor configured to allocate the first number of existing bearers, and to allocate the third number of extra bearers.

According to a sixth aspect, the object is achieved by a source network node for allocating bearers in a target network. The source network node is comprised in the source network and the target network comprises a first number of existing bearers. The source network node comprises a processor which is configured to determine a second number of required bearers in the target network for handover from the source network to the target network.

Embodiments herein afford many advantages, of which a non-exhaustive list of examples follows:

When there is a real choice to do a handover to a target system or not, i.e. the handover is triggered from other reasons than lost radio coverage, with the pre-allocation of bearer resources it is possible to make a better decision for triggering of the handover. In case there are no resources available in the target, it is better to keep the user equipment in the source system.

With the pre-allocation of bearers according to the embodiments herein it will be an advantage that it is possible for operators to optimize the network utilization and to direct the user equipment to the preferred radio technology, while at the same time avoid jeopardizing the user equipment experience by service interruptions.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relates to pre-allocation of resources in a target system.

Figure 1:
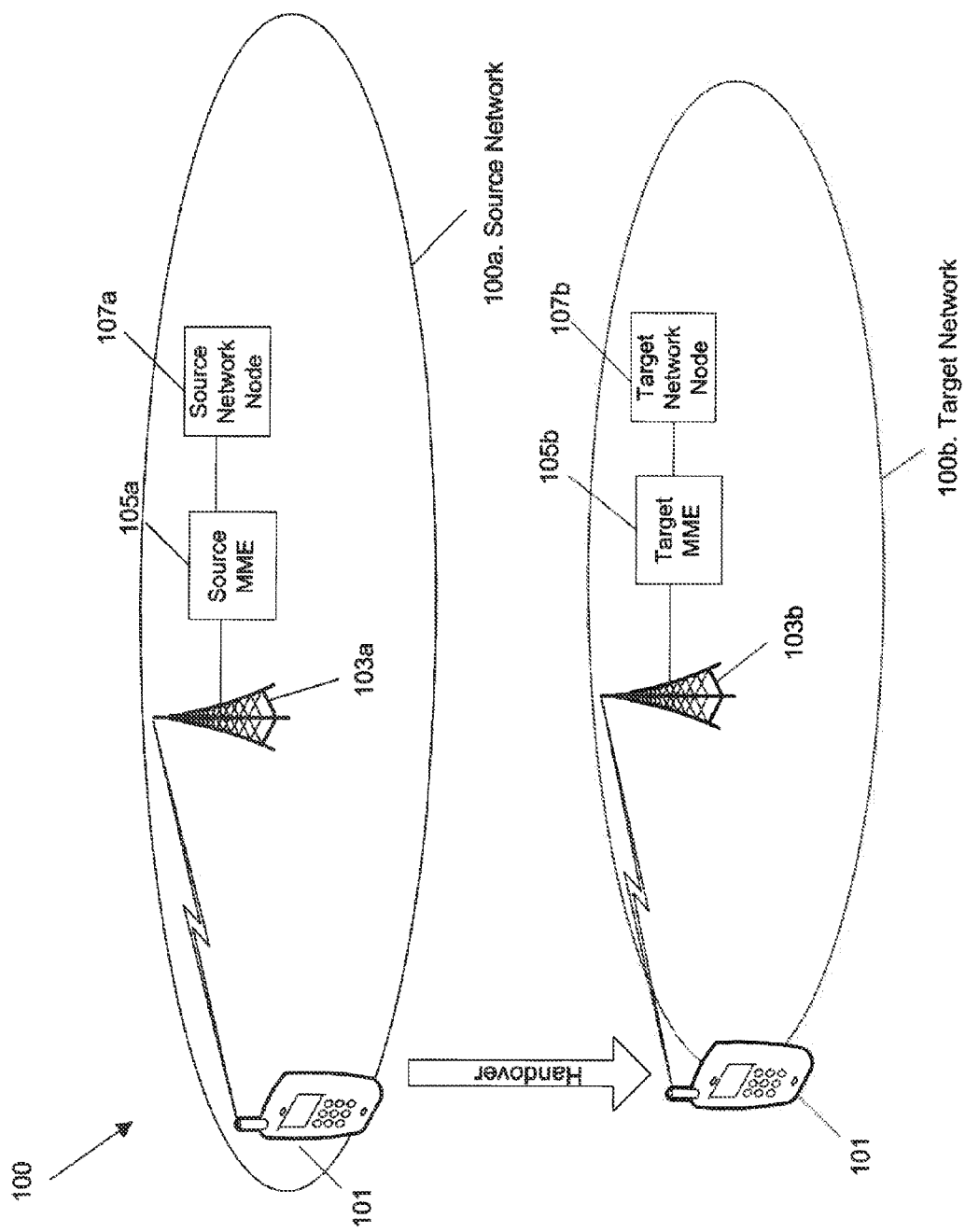
FIG. 1 is a schematic block diagram illustrating embodiments of a communications network.

FIG. 1 depicts a communications network 100 in which embodiments herein may be implemented. The communications network 100 may in some embodiments apply to one or more radio access technologies such as for example LTE, LTE Advanced, WCDMA, GSM, or any other 3GPP radio access technology or other radio access technologies such as for example a Wireless Local Area Network (WLAN).

The communications network 100 comprises a source radio access network 100a and a target radio access network 100b. In the following, the term source network 100a is used to refer to the source radio access network 100a and the term target network 100b is used to refer to the target radio access network 100b. The source network 100a may be for example a CS network and the target network 100b may be a PS network. An example of a CS network is UTRAN and GERAN and an example of a PS network is LTE and E-UT-RAN. A CS network is a technology by which e.g. two network nodes establish a dedicated communications channel, i.e. circuit, before the nodes may communicate. The circuit functions as if the nodes were physically connected as with an electrical circuit. In a PS network data is moved in separate, small blocks, i.e. packets, based on the destination address in each packet. When received, packets are reassembled in the proper sequence to make up the message. The bit delay in a CS-network is constant during a connection, as opposed to a PS network, where packet queues may cause varying packet transfer delay.

In the following, when the letter a is appended to a reference number the entity in question is comprised in the source network 100a and when the letter b is appended to a reference number the entity in question is comprised in the target network 100b.

The source network 100a comprises a source base station 103a serving a source cell. The source base station 103a may be a base station such as a NodeB, an eNB or any other network unit capable to communicate over a radio carrier with a user equipment 101 when it is present in the source network 100a. The source base station 103a is connected to a source MME 105a, and the source MME 105a is connected to a source network node 107a. The source network node 107a may be for example a source BSS, a source SGSN or a source MSC server.

The target network 100b comprises a target base station 103b serving a target cell. The target base station 103b may be a base station such as a NodeB, an eNB or any other network unit capable to communicate over a radio carrier with the user equipment 101 when it is present in the target network 100b. The target base station 103b is connected to a target MME 105b, and the target MME 105b is connected to a target network node 107b. The target network node 107b may be for example a target BSS, a target SGSN or a target MSC server.

The user equipment 101 may be any suitable communication device or computational device with communication capabilities capable to communicate with a base station over a radio channel, for instance but not limited to mobile phone, smart phone, personal digital assistant (PDA), laptop, MP3 player or portable DVD player (or similar media content devices), digital camera, or even stationary devices such as a PC. A PC may also be connected via a user equipment as the end station of the broadcast/multicast media. The user equipment 101 may also be an embedded communication device in e.g. electronic photo frames, cardiac surveillance equipment, intrusion or other surveillance equipment, weather data monitoring systems, vehicle, car or transport communication equipment, etc. The user equipment 101 is referred to as UE in some of the figures.

The user equipment 101 may be in an area with 2G/3G coverage, i.e. the user equipment 101 may be in the source network 100a. The source network 100a may be a CS network. The user equipment 101 has an ongoing IMS communications service in the source network 100a. IMS is a framework for delivering IP multimedia services. At some point, the user equipment 101 moves from the source network 100a to the target network 100b. The target network 100b may be a PS network. This may be called a handover. For some reason, an operator may want the user equipments 101 ongoing communications service to be moved from the source network 100a to the target network 100b.

Figure 2:
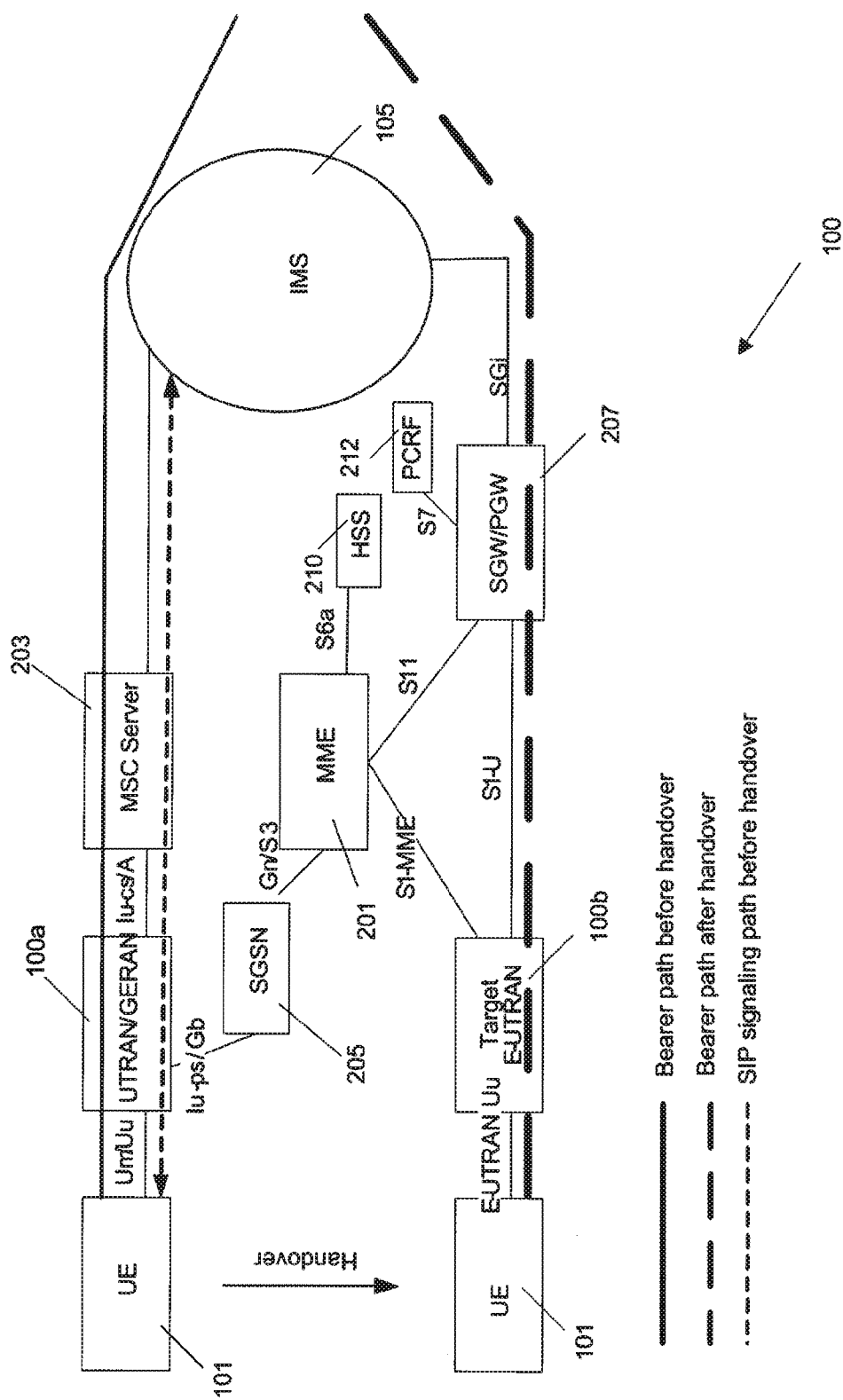
FIG. 2 is a schematic block diagram illustrating embodiments of a communications network.

FIG. 2 illustrates embodiments of the communications network 100 in more detail. In FIG. 2, the source network 100a is exemplified by a CS network, e.g. source UTRAN/GERAN, and the target network 100b is exemplified by a PS network, e.g. target E-UTRAN. The user equipment 101 is handover from the source network 100a to the PS network 100b. The interface between the user equipment 101 and the source (UTRAN/GERAN) network 100a is the Um/Uu interface. The source (UTRAN/GERAN) network 100a is connected, via an Iu-cs/A interface, to a MSC Server 203, and further to the IMS 105. As mentioned above, the MSC Server 203 controls the network switching subsystem elements. The source (UTRAN/GERAN) network 100a is connected to, via an Iu-ps/GB interface, a Serving General Packet Radio Services Support Node (SGSN) 205 which is a node responsible for the delivery of data packets from and to the user equipment 101 within its geographical service area. The SGSN 205 is connected, via a Gn/S3 interface, to the MME 105, which is the key control-node for the communications network 1000. In some embodiments, the SGSN 205 and the MME 105 are co-located in one entity, referred to as SGSN/MME and the reference numbers 205 and 105 will both be used when referring to the co-located entity. The MME 105 is connected, via an S6a interface, to a Home Subscriber Server (HSS) 210. The HSS 210 is a master user database that supports the IMS network entities that actually handle calls, and it comprises subscription-related information, performs authentication and authorization of the user equipment 101, and may provide information about the user equipments 101 location and IP information. The target (E-UTRAN) network 100b is also connected, via a S1-MME interface, to the MME 105. The interface between the user equipment 101 and the target (E-UTRAN) network 100b is the E-UTRAN Uu interface. The target (E-UTRAN) network 100b is connected, via a S1-U interface, to a Serving Packet Data Network (PDN) GateWay (GW) PGW 207. The PGW 207 is connected, via a S11 interface, to the MME 105. The PGW 207 is further connected, via a S7 interface, to a Policy and Charging Rules Function (PCRF) 212. The PCRF 212 is responsible for determining policy rules in a multimedia network. The PGW 207 is connected, via a SGi interface, to the IMS 105. The continuous lines in FIG. 2 illustrate a bearer path before the handover from the source (UTRAN/GERAN) network 100a to the target (E-UTRAN) network 100b. The broken lines illustrate a bearer path after the handover, and the dotted lines illustrate a Session Initiation Protocol (SIP) signaling path before handover. SIP is a signaling protocol used for controlling multimedia communication sessions such as voice and video calls over IP.

The method for allocating bearers in the target network 100b, according to some embodiments will now be described with reference to the combined signalling diagram and flowchart depicted in FIG. 3. The target network 100b comprises a first number of existing bearers. The method comprises the following steps, which steps may as well be carried out in another suitable order than described below.

Step 301

Before a handover is made the communications network 100 determines, based on some criteria described later, what bearer resources are required in the target network 100b. This may be done in the source network 100a or in the target network 100b, e.g. in the source network node 107a or in the target MME 105b.

In some embodiments, the target MME 105b performs the determining after it has received a request for the handover from the source network node 107a. In some embodiments, the target MME 105b performs the determining at a predetermined time. In some embodiments, the target MME 105 performs the determining upon receipt of a trigger from for example a user equipment.

Step 302

If there is a discrepancy between the actual available bearer resources that will be handed over to the target network 100b and the amount of required bearer resources, the target network 100b may trigger the pre-allocation or reservation of the extra bearer resources in the target network 100b. This may be done by signaling to the target network 100b and request of pre-allocation of extra bearer resources in addition to the existing bearers.

The relationship between the existing bearers, the required bearers and the extra bearers is as follows: Required bearers=Existing bearers+Extra bearers A check will be made to check the amount of available resources in target network 100b. When the required bearers are available, the procedure may continue to step 303. If there are no available resources in the target network 100b, or if there is not enough available resources in the target network 100b, the source network 100a may be selected or the handover procedure may be postponed or the procedure will be interrupted.

Step 303

When the target base station 103b receives the allocation request, the target base station 103 allocates the first number of existing bearers and the third number of extra bearers. The allocation of the third number of extra bearers may be a pre-allocation.

The target base station 103 may pre-allocate the extra bearers in a user equipment specific or a non-user equipment specific pool, since the actual bearer allocation to the user equipment 101 may be done later.

Step 304

When the allocation of the first number of existing bearers and the allocation of the third number of extra bearers is performed, the target base station 103b sends a response to the target MME 105b informing it about the result of the allocation.

For the rSRVCC example, the source network 100a knows that in addition to the existing PS bearers, there will be a need for extra bearer resources for voice in the target network 100b. For example, the user equipment 101 may have two PS bearers and one CS bearer in the source network 100a. After rSRVCC to the target network 100b, e.g. LTE, the user equipment 101 will need at least 3 PS bearers, i.e. the two original ones, plus one more to replace the 2G CS bearer, where the voice media may be sent. The network then triggers pre-allocation of the extra voice bearer in the target network 100b.

rSRVCC has been used as one example, but the method may apply to any type of bearers and in general to all types of handover, such as Inter Radio Access Technology HandOver (IRAT HO) or PS handover or Same Radio Technologies, Same Network Technology (SRSN) Relocation. The situation is that there needs to be some sort of service knowledge in the core network. This knowledge may e.g. come from the user equipment 101. One use case may be that the user equipment 101 requests for IRAT HO from the source network 100a, e.g. 2G, to the target network 100b, e.g. LTE. In other words, an IRAT HO to an alternative/better radio technology, based on preference, changing service demands or after the user equipment 101 have tried to allocate more resources in the source network 100a, but not succeeded. What is needed here is then that the user equipment 101 signals to the BSC/RNC that handover is needed and also that more resources are needed in the target network 100b.

Example embodiments for rSRVCC and IRAT HO will now be described in more detail.

rSRVCC

The method for handling handover of the communications service for the non-DTM case for the rSRVCC procedure according to some embodiments will now be described with reference to the combined signalling diagram and flowchart depicted in FIG. 4. The following description uses an IMS voice call as example. However, any other type of communications service or multimedia service, such as e.g. video call, is also applicable. The method comprises the following steps, which steps may as well be carried out in another suitable order than described below.

Step 401

The source network 100a triggers that a handover to LTE is needed. The source network 100a represented by a BSC/RNC 420 transmits a handover required message to the MSC Server 203.

Step 402

Figure 3:
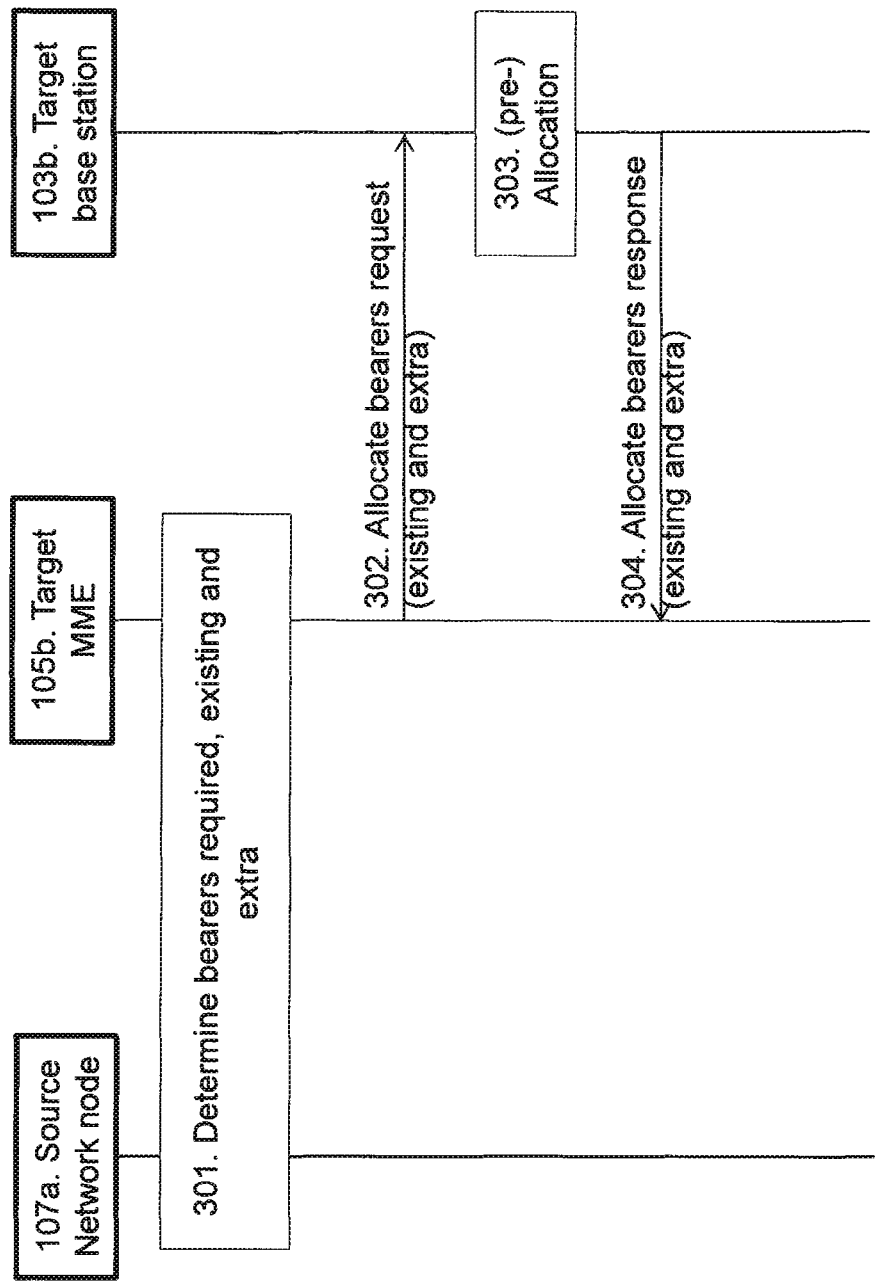
FIG. 3 is a combined flow chart and signaling diagram illustrating embodiment of a method.

This step corresponds to step 302 in FIG. 3.

The MSC 203 sends a CS to PS handover request to the target MME 201b and includes information about the service, e.g. if the user equipment 101 is doing a voice call or a video call. Information about QoS may also be included in the handover request message.

Step 403

Target MME 201b sends a requests to the source SGSN 205a requesting the existing PDP Contexts, i.e. bearers.

Step 404

The source SGSN 205a sends a context response for the existing PS bearers to the target MME 201b. The target MME 201b determines based on the information from the MSC 203 that extra bearer resources will be needed after the rSRVCC handover. The QoS, i.e. QoS Class Indicator (QCI) and GBR, for these extra bearers is determined.

Step 405

This step corresponds to step 302 and 304 in FIG. 3.

The target MME 201b transmits a requests to the target base station 103b to allocate the existing bearers and also pre-allocation of the extra bearers. The request comprises information about QoS and GBR.

The target base station 103b pre-allocates or reserves the extra bearers. The extra bearers are pre-allocated in a non-user equipment specific pool or a user equipment specific pool in the target base station 103b or the target base station 103b checks it there are resources available.

The target base station 103b transmits the result of the pre-allocation back to the target MME 105b. The non-user equipment specific pool and the user equipment specific pool is information stored in a memory unit in the target base station 103b.

Step 406

The target MME 105b sends a CS to PS acknowledge/response to the MSC 203 including the result of bearer allocation and pre-allocation.

Step 407

The MSC server 203 sends a CS to PS handover command to the user equipment 101, via the BSC/RNC 420.

In some embodiments, the MSC 203 determines, based on information from the target MME 201b when the rSRVCC procedure shall continue. This step may have already been done by the target MME 105b. The MSC 203 sends a handover command to the source network 100a, which triggers the user equipment 101 to move to the target network 100b, e.g. LTE.

Step 408

The MSC Server 203 sends a re-INVITE message to an access transfer control function (ATCF) 501 to update the media path. This is IMS signaling for the rSRVCC.

Step 409

The user equipment 101 sends a CS to PS handover complete message to the MSC server 203.

Step 410

The target base station 103b sends a Handover Notify message to the target MME 105b.

Step 411

The target MME 105b sends a Modify Bearers request to the SGW/PGW 207.

Step 412

The VoIP call flows on the default bearer user plane between the user equipment 101 and the SGW/PGW 207.

Step 413

The SGW/PGW 207 sends a RAT change update to the PCRF 212.

Step 414

The dedicated bearer is setup.

Step 415

The VoIP call flows on the dedicated bearer user plane between the user equipment 101 and the SGW/PGW 207.

The user equipment 101 appears in the target network 100b, e.g. LTE, and a new GBR bearer, or bearers in case of voice and video, that may be used for voice is allocated from the pre-allocated pool and the voice call continues.

In the case where resources are pre-allocated, but the actual resource reservation is not utilized, a timer may be set to de-allocate the resources in the target network 100b. In some embodiments, it may be possible to also free the pre-allocated resources when they are linked to the user equipment 101 i.e. if the target network 100b reserved resources in a user equipment-specific manner.

IRAT HO Procedure

When the user equipment 101 reaches the end of coverage area for UMTS services, it may handover the communications service to a 2G service like GSM, when the user equipment 101 supports multiple RAT. The IRAT handover procedure may be initiated in variety of ways. A Radio Network Subsystem (RNS) may send a command to perform handover from UTRAN. This command explicitly instructs the user equipment 101 to move to a different RAT or the user equipment 101 may select a cell that belongs to a different RAT. Another possibility is that the network may ask the user equipment 101 to perform a cell change order from UTRAN.

IRAT hard handover using the handover from UTRAN command may be performed when there are no Radio Access Bearers (RABs) or when there is at least one CS domain RAB. The state of the user equipment 101 may be CELL_DCH.

IRAT hard handover using the cell change order from UTRAN may be performed when the user equipment 101 is either in CELL_DCH or CELL_FACH state. The only requirement may be that there should be at least a PS signaling connection and no CS signaling connection.

The method for handling handover of the communications service for the IRAT handover procedure according to some embodiments will now be described with reference to the combined signalling diagram and flowchart depicted in FIG. 5.

Step 500

Uplink and downlink user plane PDUs are transmitted and received between the PGW 207, the source SGSN 205a, the source BSS 520a and the user equipment 101.

Step 501

The user equipment 101 initiates the handover by signaling to the source BSS 520a that a handover to a better radio cell would be appreciated and also that more resources are needed in the target network 100b. After step 501, the procedure proceeds with respect to pre-allocation in analogy to the rSRVCC procedure described above with reference to FIG. 4.

Step 502

The source BSS 520a sends a PS handover required message to the source SGSN 205a. The message comprises the pre-allocated bearers, i.e. QoS and GBR.

Step 503

Figure 4:
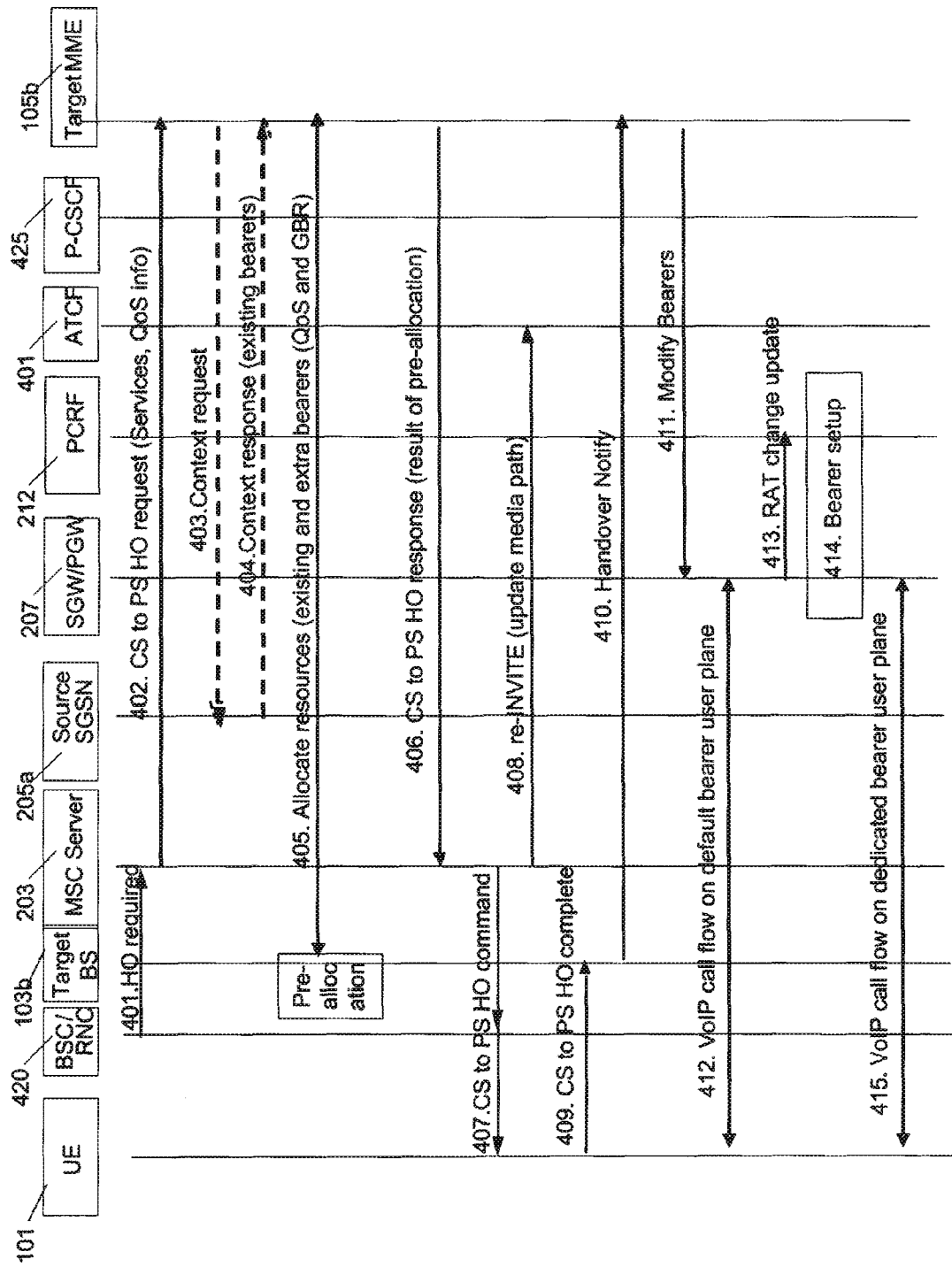
FIG. 4 is a combined flow chart and signaling diagram illustrating embodiment of a method with rSRVCC.

This step corresponds to step 301 and 302 in FIG. 3 and to step 402 in FIG. 4.

The source SGSN 205a sends a forward relocation request to the target MME 105b. The request comprises information about the existing and pre-allocated bearers, i.e. QoS and GBR.

Step 504

This step corresponds to step 304 in FIG. 3, step 405 in FIG. 4. The target MME 105b sends a create session request to the target SGW 207b.

Step 504a

The target SGW 207b sends a create session response to the target MME 105b.

Step 505

This step corresponds to step 302 in FIG. 3 and to step 405 in FIG. 4.

The target MME 105b sends a handover request to the target base station 103b. The handover request comprises information about the existing and pre-allocated bearers, QoS and GBR. The target base station 103b performs the pre-allocation.

Step 505b

This step corresponds to step 304 in FIG. 3, step 405 in FIG. 4.

The target base station 103b sends a handover request acknowledge comprising the result of the pre-allocation.

Step 506

The target MME 105b sends a create indirect data forwarding tunnel request to the target SGW 207b.

Step 506a

The target SGW 207b sends a create indirect data forwarding tunnel response back to the target MME 105b.

Step 507

This step corresponds to step 405 in FIG. 4. The target MME 105b sends a forward relocation response comprising the result of pre-allocation to the source SGSN 205a.

Step 508

The source SGSN 205a sends a create indirect data forwarding tunnel request to the source SGW 207a.

Step 508a

The source SGW 207a sends a create indirect data forwarding tunnel response back to the source SGSN 205a.

Figure 6:
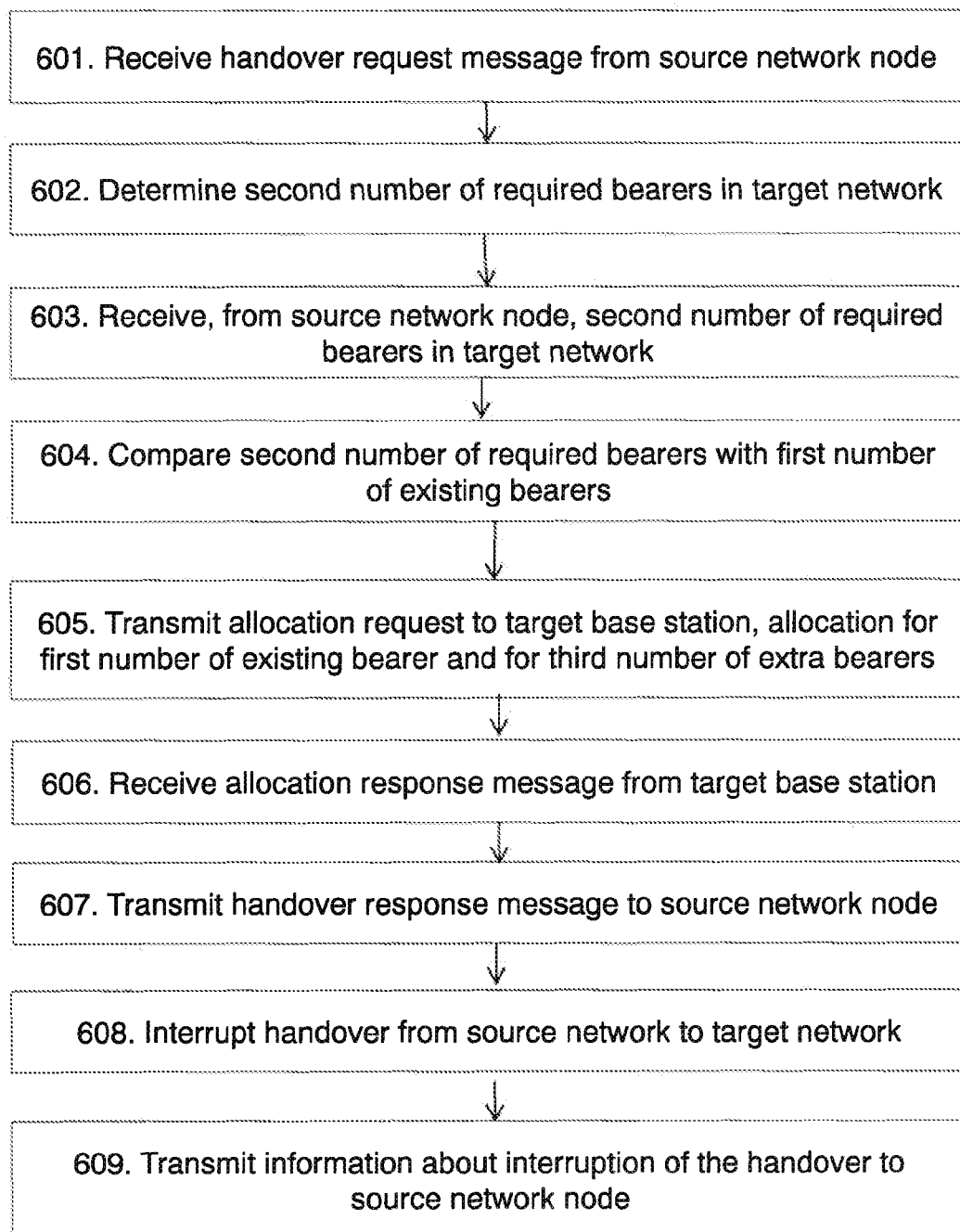
FIG. 6 is a flow chart illustrating embodiments of a method in a target MME.

The method described above will now be described seen from the perspective of the target MME 105b. FIG. 6 is a flowchart describing the present method in the target MME 105b for allocating bearers in a target network 100b. The target MME 105b is comprised in the target network 100b and the target network 100b comprises a first number of existing bearers. The source network 100a may be a CS network and the target network 100b may be a PS network, or the source network 100a may be a PS network and the target network 100b may be a CS network. In some embodiments, a communication service to be handover from the source network 100a to the target network 100b comprises at least one of a voice service and a video service. The handover may be a SRNS relocation or a rSRVCC handover or an IRAT HO. The SRNS relocation procedure may not be, strictly speaking, a handover procedure but it may be used in combination with the handover procedure. An important feature of the communications network 100 is the ability to allow user equipments 100 to move within and outside particular networks. This may require a process known as SRNS relocation, in which an existing SRNS is replaced by a target SRNS. The method comprises the following steps to be performed by the target MME 105b, which steps may be performed in any suitable order:

Step 601

Figure 5:
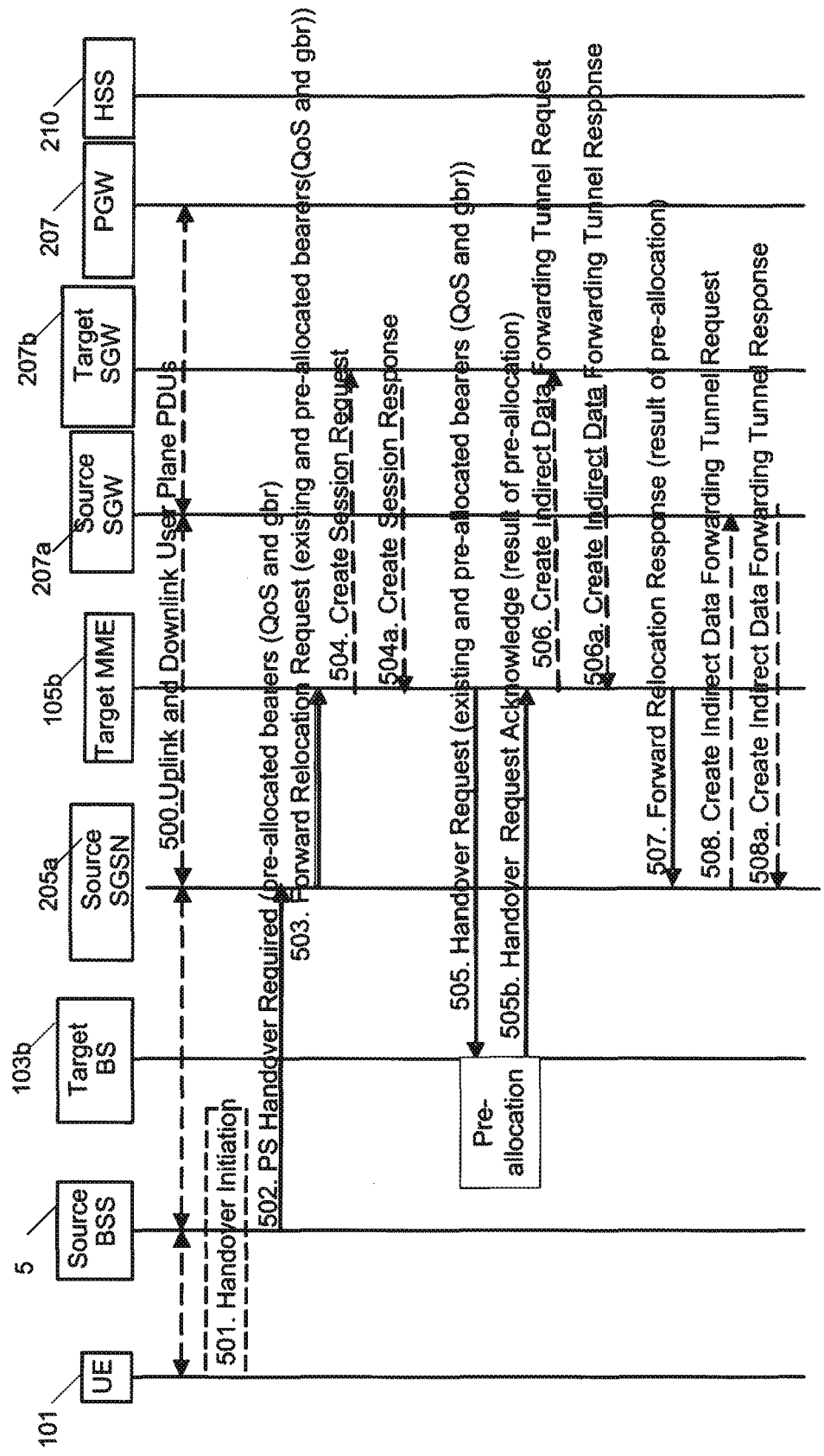
FIG. 5 is a combined flow chart and signalling diagram illustrating embodiments of a method with IRAT HO.

This step corresponds to step 302 in FIG. 3, step 402 in FIG. 4 and to step 503 in FIG. 5.

In some embodiments, the target MME 105b receives a handover request message from the source network node 107a. The handover request message comprises a request for handover from the source network 100a to the target network 100b. The source network node 107a may be a MSC or a source SGSN. The handover request message may further comprise information about the communications service to be handed over to the target network 100b.

The handover request message may comprise the information about the extra bearers that may be needed in the target network 100b, such as e.g. a new voice or video bearer as in the case of rSRVCC. The handover request message may comprise information about a context for an existing bearer.

Step 602

This step corresponds to step 301 in FIG. 3.

This is a step that is performed instead of step 603. In some embodiments, the target MME 105b determines the second number of required bearers in the target network 100b for handover from a source network 100a to the target network 100b.

Step 603

This step corresponds to step 301 in FIG. 3 and to step 503 in FIG. 5. This is a step that is performed instead of step 602.

In some embodiments, the target MME 105b receives, from the source network node 107a, the second number of required bearers in the target network 100b for handover from the source network 100a to the target network 100b.

Step 604

In some embodiments, the target MME 105b compares the second number of required bearers with the first number of existing bearers.

Step 605

This step corresponds to step 302 in FIG. 3, step 405 in FIG. 4 and step 505 in FIG. 5.

When a second number of required bearers is larger than the first number of existing bearers in the target network 100b, the target MME 105b transmits an allocation request message to a target base station 103b. The allocation request message comprises a request for allocation of the first number of existing bearers and a request for allocation of a third number of extra bearers in the target network 100b.

In some embodiments, the allocation request message is sent to the target base station 103b when the second number of required bearers is larger than the first number of existing bearers in the target network 100b and when the second number of required bearers is lower than a fourth number of available bearers in the target network 100b.

The request for allocation of a third number of extra bearers in the target network 100b may be a request for pre-allocation of the third number of extra bearers in the target network 100b.

Step 606

This step corresponds to step 304 in FIG. 3, step 405 in FIG. 4 and to step 505b in FIG. 5.

In some embodiments, the target MME 105b receives an allocation response message from the target base station 103b. The allocation response message comprises information about the allocation of the first number of existing bearers and allocation of the third number of extra bearers.

Step 607

This step corresponds to step 405 in FIG. 4 and step 507 in FIG. 5. In some embodiments, the target MME 105b transmits a handover response message to a source network node 107a. The handover response message comprises information about the allocation of the first number of existing bearers and the third number of extra bearers.

Step 608

In some embodiments, when the second number of required bearers is higher than a fourth number of available bearers in the target network 100b, the target MME 105b interrupts or halts the handover from the source network 100a to the target network 100b.

Step 609

In some embodiments, the target MME 105b transmits information about the interruption or halting of the handover to the source network node 107a.

Figure 7:
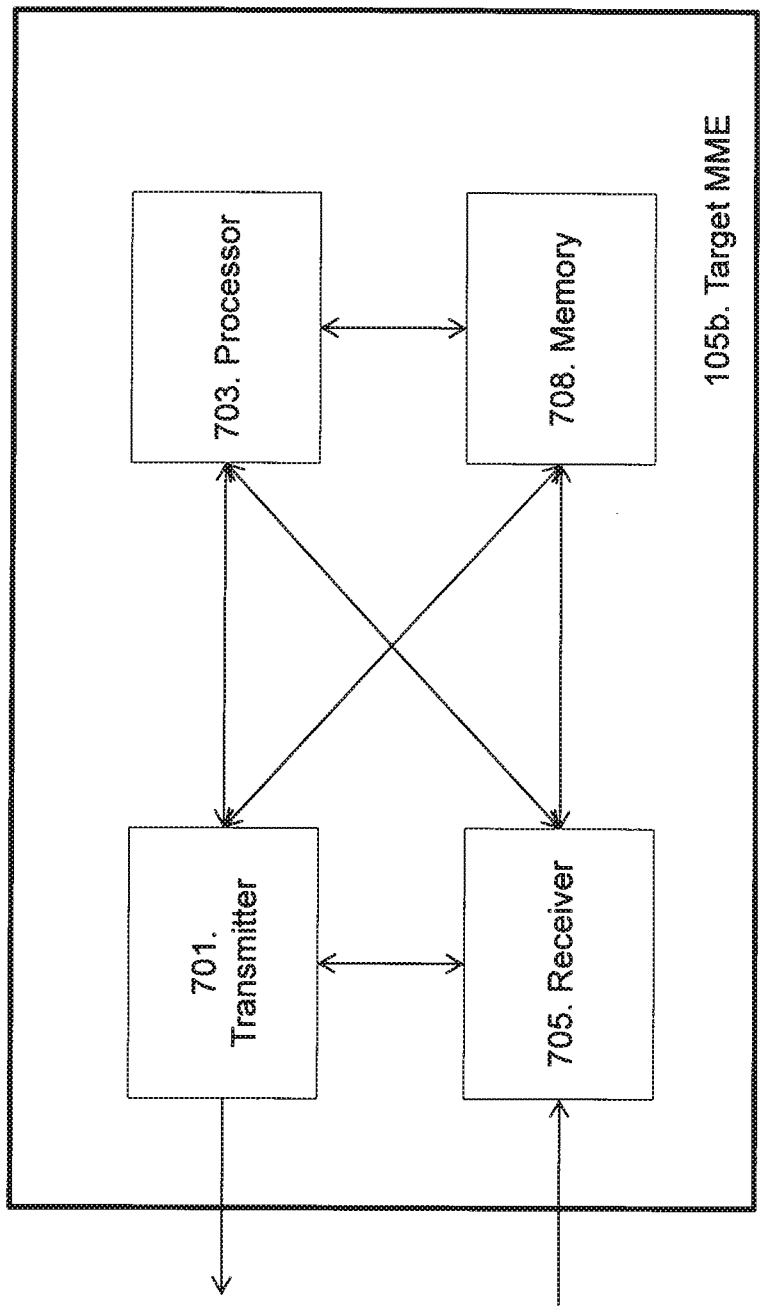
FIG. 7 is a schematic block diagram illustrating embodiments of a target MME.

To perform the method steps shown in FIG. 6 for allocating bearers in a target network 100b the target MME 105b comprises an arrangement as shown in FIG. 7. The target MME 105b is comprised in the target network 100b and the target network 100b comprises a first number of existing bearers. The source network 100a may be a CS network and the target network 100b may be a PS network, or the source network 100a may be a PS network and the target network 100b may be a CS network. The source network node 107a may be a MSC or SGSN. The handover may be a SRNS relocation or a rSRVCC handover or an IRAT HO. In some embodiments, a communication service to be handover from the source network 100a to the target network 100b comprises at least one of a voice service and a video service.

The target MME 105b comprises a transmitter 701 configured to, when a second number of required bearers is larger than the first number of existing bearers in the target network 100b, transmit an allocation request message to a target base station 103b. The allocation request message comprises a request for allocation of the first number of existing bearers and a request for allocation of a third number of extra bearers in the target network 100b. In some embodiments, the transmitter 701 is further configured to transmit a handover response message to a source network node 107a. The handover response message comprises information about the allocation of the first number of existing bearers and the third number of extra bearers. In some embodiments, the allocation request message is transmitted to the target base station 103b when the second number of required bearers is larger than the first number of existing bearers in the target network 100b and when the second number of required bearers is lower than a fourth number of available bearers in the target network 100b. In some embodiments, the transmitter 701 is further configured to transmit information about the interruption of the handover to the source network node 107a. The request for allocation of a third number of extra bearers in the target network 100b may be a request for pre-allocation of the third number of extra bearers in the target network 100b.

In some embodiments, the target MME 105b further comprises a processor 703 configured to determine the second number of required bearers in the target network 100b for handover from a source network 100a to the target network 100b. In some embodiments, the processor 703 is further configured to compare the second number of required bearers with the first number of existing bearers. In some embodiments, the processor 703 is further configured to, when the second number of required bearers is higher than a fourth number of available bearers in the target network 100b, interrupt a handover from a source network 100a to the target network 100b.

In some embodiments, the target MME 105b further comprises a receiver 705 configured to receive, from the source network node 107a, the second number of required bearers in the target network 100b for handover from a source network 100a to the target network 100b. In some embodiments, the receiver 705 may be further configured to receive a handover request message from a source network node 107a. The handover request message comprises a request for handover from a source network 100a to the target network 100b. In some embodiments, the receiver 705 is further configured to receive an allocation response message from the target base station 103b. The allocation response message comprises information about the allocation of the first number of existing bearers and allocation of the third number of extra bearers.

The target MME 105b may further comprise a memory 708 comprising one or more memory units. The memory 708 is arranged to be used to store data, received data streams, power level measurements, threshold values, number of bearers, request messages, reply messages, handover information, information about the communications service, time periods, configurations, schedulings, and applications to perform the methods herein when being executed in the target MME 105b.

Those skilled in the art will also appreciate that the transmitter 701 and the receiver 705 described above may refer to a combination of analog and digital circuits, and/or one or more processors configured with software and/or firmware, e.g. stored in a memory, that when executed by the one or more processors such as the processor 703 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
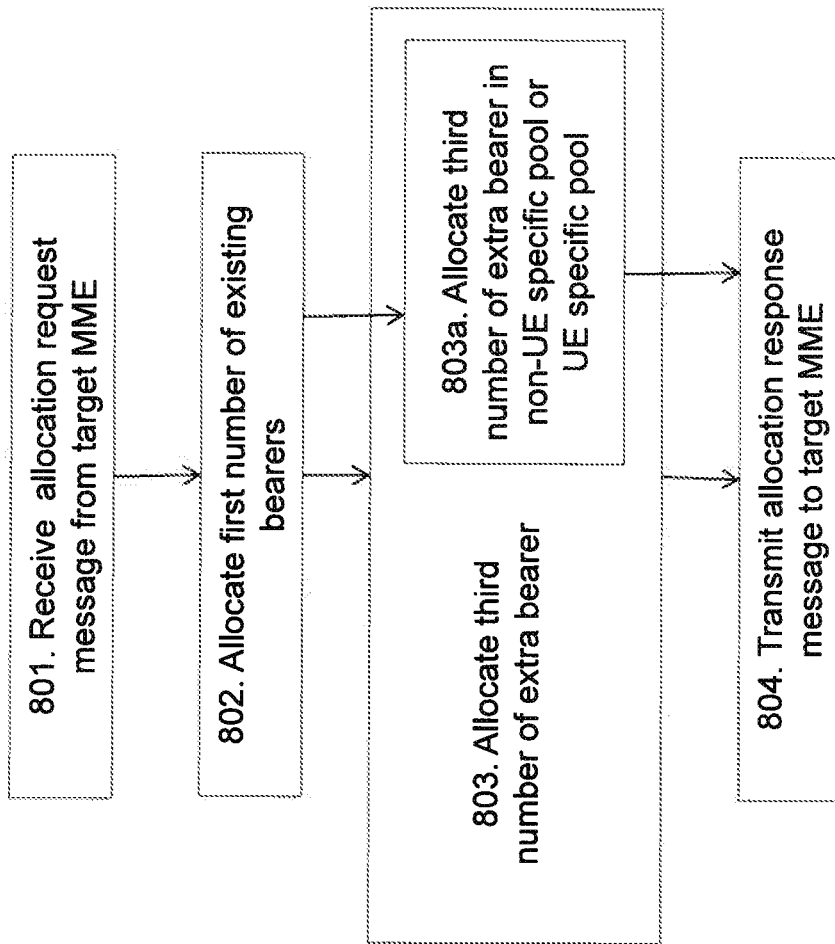
FIG. 8 is a flow chart illustrating embodiments of a method in a target base station.

The method described above will now be described seen from the perspective of the target MME 105b. FIG. 8 is a flowchart describing the present method in the target base station 103b for allocating bearers in a target network 100b. The target base station 103b is comprised in the target network 100b and the target network 100b comprises a first number of existing bearers. The source network 100a may be a CS network and the target network 100b may be a PS network, or the source network 100a may be a PS network and the target network 100b may be a CS network. The handover may be a SRNS relocation or a rSRVCC handover or an IRAT HO. In some embodiments, a communication service to be handover from the source network 100a to the target network 100b comprises at least one of a voice service and a video service. The method comprises the following steps to be performed by the target base station 103b, which steps may be performed in any suitable order:

Step 801

This step corresponds to step 302 in FIG. 3, step 405 in FIG. 4 and to step 505 in FIG. 5. When a second number of required bearers is larger than the first number of existing bearers in the target network 100b, the target base station 103b receives an allocation request message from the target MME 105b. The allocation request message comprises a request for allocation of the first number of existing bearers and a request for allocation of a third number of extra bearers in the target network 100b.

Step 802

This step corresponds to step 303 in FIG. 3.

The target base station 103b allocates the first number of existing bearers.

Step 803

This step corresponds to step 303 in FIG. 3.

The target base station 103b allocates the third number of extra bearers.

The allocation of the third number of extra bearers may be a pre-allocation of the third number of extra bearers in the target network 100b.

Step 803a

This is a substep of step 803. In some embodiments, the target base station 103b allocates the third number of extra bearers in a non-user equipment specific pool or a user equipment specific pool.

Step 804

This step corresponds to step 304 in FIG. 3, step 405 in FIG. 4 and to step 505b in FIG. 5. In some embodiments, the target base station 103b transmits an allocation response message to the target MME 105b. The allocation response message comprises information about the allocation of the first number of existing bearers and the third number of extra bearers.

Figure 9:
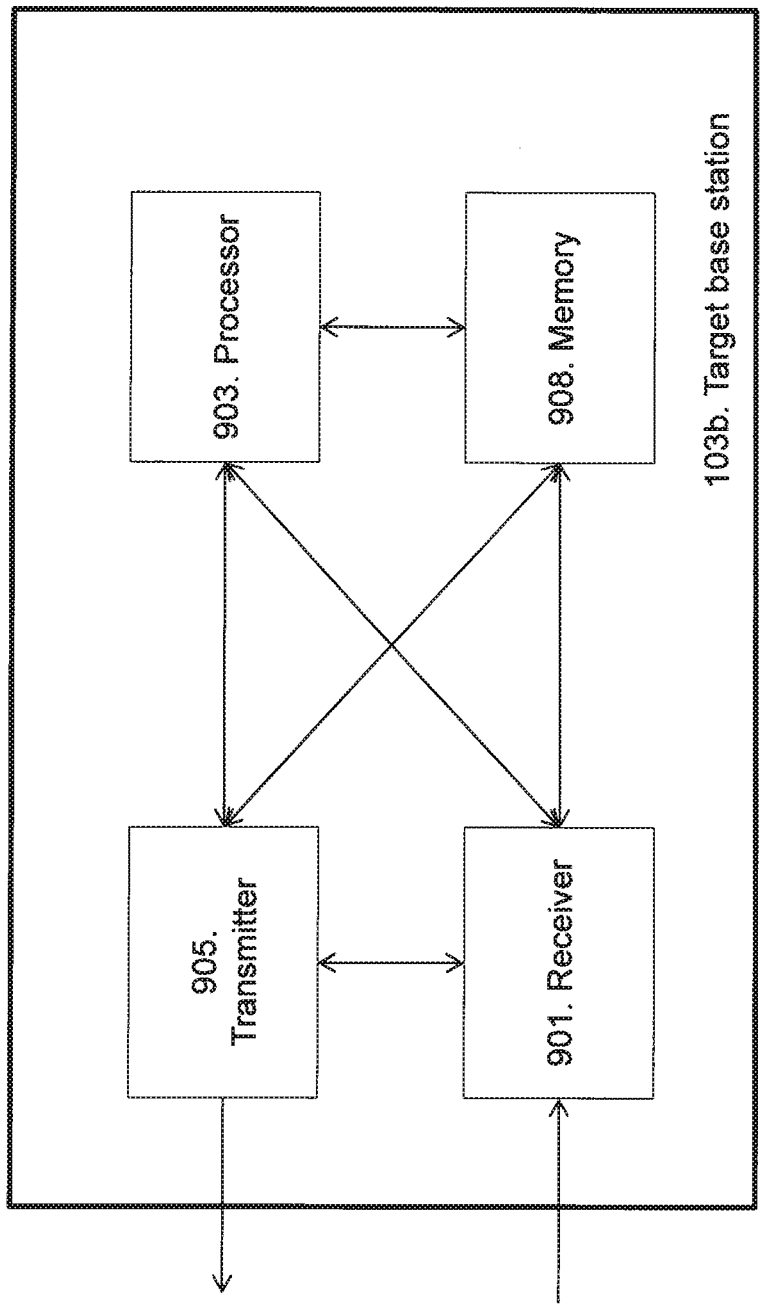
FIG. 9 is a schematic block diagram illustrating embodiments of a target base station.

To perform the method steps shown in FIG. 8 for allocating bearers in a target network 100b the target base station 103b comprises an arrangement as shown in FIG. 9. The target base station 103b is comprised in the target network 100b and the target network 100b comprises a first number of existing bearers. The source network 100a may be a CS network and the target network 100b may be a PS network, or the source network 100a may be a PS network and the target network 100b may be a CS network. The handover may be a SRNS relocation or a rSRVCC handover or an IRAT HO. In some embodiments, a communication service that is to be handed over from the source network 100a to the target network 100b comprises at least one of a voice service and a video service.

The target base station 103b comprises a receiver 901 configured to, when a second number of required bearers is larger than the first number of existing bearers in the target network 100b, receive an allocation request message from the target MME 105b. The allocation request message comprises a request for allocation of the first number of existing bearers and a request for allocation of a third number of extra bearers in the target network 100b.

The target base station 103b comprises a processor 903 which is configured to allocate the first number of existing bearers, and to allocate the third number of extra bearers. In some embodiments, the processor 803 is further configured to allocate the third number of extra bearers in a non-user equipment specific pool or a user equipment specific pool. In some embodiments, the allocation of the third number of extra bearers is a pre-allocation of the third number of extra bearers in the target network 100b.

The target base station 103b may further comprise a transmitter 905 configured to transmit an allocation response message to the target MME 105b. The allocation response message comprises information about the allocation of the first number of existing bearers and the third number of extra bearers.

The target base station 103b may further comprise a memory 908 comprising one or more memory units. The memory 908 is arranged to be used to store data, received data streams, power level measurements, threshold values, number of bearers, request messages, reply messages, handover information, information about the communications service, time periods, configurations, schedulings, and applications to perform the methods herein when being executed in the target base station 103b.

Those skilled in the art will also appreciate that the transmitter 905 and the receiver 901 described above may refer to a combination of analog and digital circuits, and/or one or more processors configured with software and/or firmware, e.g. stored in a memory, that when executed by the one or more processors such as the processor 903 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
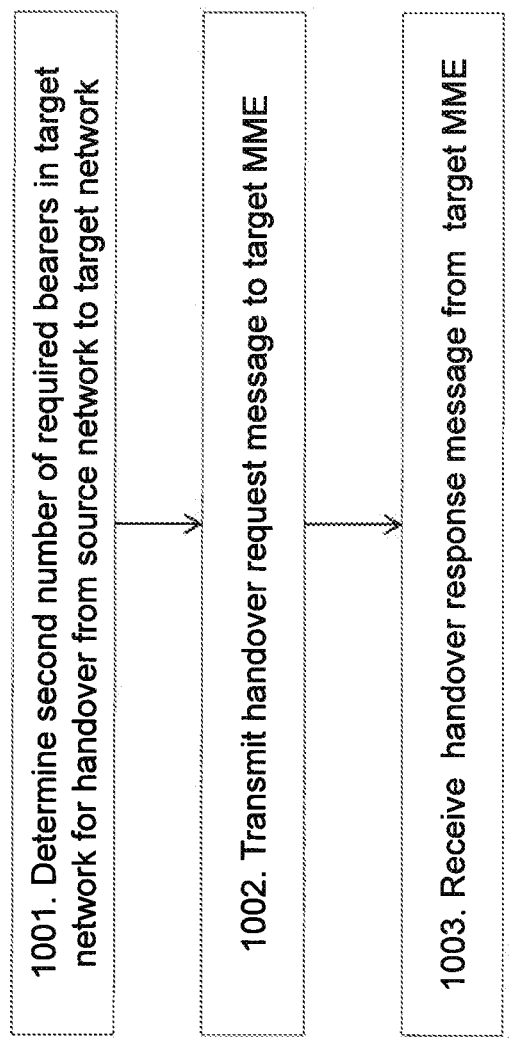
FIG. 10 is a flow chart illustrating embodiments of a method in a source network node.

The method described above will now be described seen from the perspective of the source network node 107a. FIG. 10 is a flowchart describing the present method in the source network node 107a for allocating bearers in a target network 100b. The target base station 103b is comprised in the target network 100b and the target network 100b comprises a first number of existing bearers. The source network 100a may be a CS network and the target network 100b may be a PS network, or the source network 100a may be a PS network and the target network 100b may be a CS network. The handover may be a SRNS relocation or a rSRVCC handover or an IRAT HO. In some embodiments, a communication service to be handover from the source network 100a to the target network 100b comprises at least one of a voice service and a video service.

The source network node 107a may be a MSC or a SGSN. The method comprises the following steps to be performed by the source network node 107a, which steps may be performed in any suitable order:

Step 1001

This step corresponds to step 301 in FIG. 3.

The source network node 107a determines a second number of required bearers in the target network 100b for handover from the source network 100a to the target network 100b.

Step 1002

This step corresponds to step 301 in FIG. 3 and to step 402 in FIG. 4.

In some embodiments, the source network node 107a transmits a handover request message to a target MME 105b. The handover request message comprises a request for handover from the source network 100a to the target network 100b. The handover request message may comprise the determined second number of required bearers.

Step 1003

This step corresponds to step 406 in FIG. 4 and step 507 in FIG. 5.

In some embodiments, the source network node 107a receives a handover response message from the target MME 105b. The handover request response message comprises information about an allocation of the first number existing bearers and a third number of extra bearers. The allocation of the third number of extra bearers may be a pre-allocation of the third number of extra bearers in the target network 100b.

Figure 11:
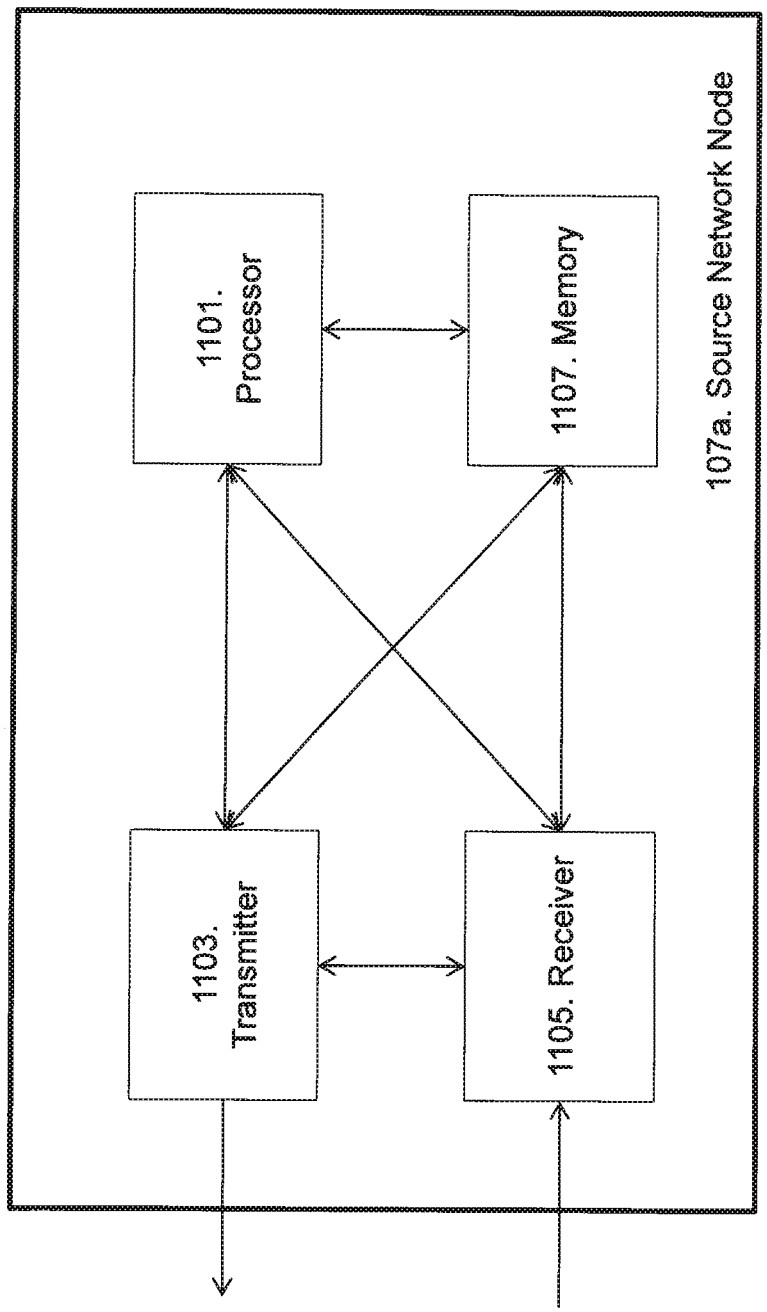
FIG. 11 is a schematic block diagram illustrating embodiments of a source network node.

To perform the method steps shown in FIG. 10 for allocating bearers in a target network 100b the source network node 107a comprises an arrangement as shown in FIG. 11.

The source network node 107a is comprised in the source network 100a and the target network 100b comprises a first number of existing bearers. The source network 100a may be a CS network and the target network 100b may be a PS network, or the source network 100a is a PS network and the target network 100b is a CS network.

The source network node 107a may be a MSC or a source SGSN.

The source network node 107a comprises a processor 1101 configured to determine a second number of required bearers in the target network 100b for handover from the source network 100a to the target network 100b. The handover may be a SRNS relocation or a rSRVCC handover or an IRAT HO. In some embodiments, a communication service that is to be handed over from the source network 100a to the target network 100b comprises at least one of a voice service and a video service.

The source network node 107a may comprise a transmitter 1103 configured to transmit a handover request message to the target MME 105b. The handover request message comprises a request for handover from the source network 100a to the target network 100b.

In some embodiments, the source network node 107a further comprises a receiver 1105 configured to receive a handover response message from the target MME 105b. The handover request response message comprises information about an allocation of the first number existing bearers and a third number of extra bearers. The allocation of the third number of extra bearers may be a pre-allocation of the third number of extra bearers in the target network 100b.

The source network node 107a may further comprise a memory 1107 comprising one or more memory units. The memory 1107 is arranged to be used to store data, received data streams, power level measurements, threshold values, number of bearers, request messages, reply messages, handover information, information about the communications service, time periods, configurations, schedulings, and applications to perform the methods herein when being executed in the source network node 107a.

Those skilled in the art will also appreciate that the transmitter 1103 and the receiver 1105 described above may refer to a combination of analog and digital circuits, and/or one or more processors configured with software and/or firmware, e.g. stored in a memory, that when executed by the one or more processors such as the processor 1101 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present mechanism for enabling for allocating bearers in a target network 100b may be implemented through one or more processors, such as the processor 703 in the target MME 105b depicted in FIG. 7, the processor 903 in the target base station 103b depicted in FIG. 9 and the processor 1101 in the source network node 107a depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into target MME 105b and/or target base station 103b and/or the source network node 107a. One such carrier may be in the form of a CD ROM disc. It is however feasible with other data carriers such as a memory stick. The computer program code may furthermore be provided as pure program code on a server and downloaded to the target MME 105b and/or target base station 103b and/or the source network node 107a.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a target Mobility Management Entity, MME, for allocating bearers in a target network, which target MME is comprised in the target network and which target network comprises a first number of existing bearers, the method comprising:
    determining whether a second number of required bearers is larger than the first number of existing bearers in the target network; and
    when it is determined that the second number of required bearers is larger than the first number of existing bearers in the target network, transmitting an allocation request message to a target base station, which allocation request message comprises a request for allocation of the first number of existing bearers and a request for allocation of a third number of extra bearers in the target network.

2. The method according to claim 1, further comprising:
    determining the second number of required bearers in the target network for handover from a source network to the target network.

3. The method according to claim 2, wherein the source network is a PS network and the target network is a CS network.

4. The method according to claim 2, wherein determining the second number of required bearers in the target network for handover from a source network to the target network comprises:
    receiving, from a source network node, the second number of required bearers in the target network for handover from the source network to the target network.

5. The method according to claim 1, further comprising:
    receiving a handover request message from a source network node, which handover request message comprises a request for handover from a source network to the target network.

6. The method according to claim 5, further comprising:
    receiving an allocation response message from the target base station, which allocation response message comprises information about the allocation of the first number of existing bearers and allocation of the third number of extra bearers; and
    transmitting a handover response message to a source network node, which handover response message comprises information about the allocation of the first number of existing bearers and the third number of extra bearers.

7. The method according to claim 1, further comprising: comparing the second number of required bearers with the first number of existing bearers.

8. The method according to claim 1, wherein
the method further comprises: i) the target MME determining a number of available bearers in the target network and ii) the target MME determining whether the second number of required bearers is lower than the determined number of available bearers, and
the target MME is configured such that the target MME transmits the allocation request message to the target base station when the second number of required bearers is larger than the first number of existing bearers in the target network and when the second number of required bearers is lower than the determined number of available bearers in the target network.

9. The method according to claim 1, further comprising:
the target MME determining a number of available bearers in the target network;
the target MME determining whether the second number of required bearers is lower than the determined number of available bearers; and
in response to determining that the second number of required bearers is lower than the determined number of available bearers, the target MME interrupting a handover from a source network to the target network.

10. The method according to claim 9, further comprising transmitting information about the interruption of the handover to the source network node.

11. The method according to claim 1, wherein the request for allocation of a third number of extra bearers in the target network is a request for pre-allocation of the third number of extra bearers in the target network.

12. The method according to claim 2, wherein the source network is a Circuit Switched, CS, network and the target network is a Packet Switched, PS, network.

13. The method according to claim 1, wherein
the source network node is a Mobile Switching Centre, MSC, or a source Serving General Packet Radio Services Support Node, SGSN, and
the handover is a Serving Radio Network Subsystem, SRNS, relocation or a Reverse Single Radio Voice Call Continuity, rSRVCC, handover or an Inter Radio Access Technology HandOver, IRAT HO.

14. The method according to claim 1, wherein a communication service to be handover from the source network to the target network comprises at least one of a voice service and a video service.

15. A method in a target base station for allocating bearers in a target network, which target base station is comprised in the target network and which target network comprises a first number of existing bearers, the method comprising:
when a second number of required bearers is larger than the first number of existing bearers in the target network, receiving an allocation request message from a target Mobility Management Entity, MME, which allocation request message comprises a request for allocation of the first number of existing bearers and a request for allocation of a third number of extra bearers in the target network;
allocating the first number of existing bearers; and
allocating the third number of extra bearers.

16. The method according to claim 15, further comprising:
transmitting an allocation response message to the target MME, which allocation response message comprises information about the allocation of the first number of existing bearers and the third number of extra bearers.

17. The method according to claim 15, wherein the allocating the third number of extra bearers further comprises:
allocating the third number of extra bearers in a non-user equipment specific pool or a user equipment specific pool.

18. The method according to claim 15, wherein the allocation of the third number of extra bearers is a pre-allocation of the third number of extra bearers in the target network.

19. The method according to claim 15, wherein the source network is a Circuit Switched, CS, network and the target network is a Packet Switched, PS, network; or wherein the source network is a PS network and the target network is a CS network.

20. The method according to claim 15, wherein the handover is a Serving Radio Network Subsystem, SRNS, relocation or a Reverse Single Radio Voice Call Continuity, rSRVCC, handover or an Inter Radio Access Technology HandOver, IRAT HO.

21. The method according to claim 15, wherein a communication service to be handover from the source network to the target network comprises at least one of a voice service and a video service.

22. A method in a source network node for allocating bearers in a target network, which source network node is comprised in the source network and which target network comprises a first number of existing bearers, the method comprising:
determining a second number of required bearers in the target network for handover from the source network to the target network.

23. The method according to claim 22, further comprising:
transmitting a handover request message to a target Mobility Management Entity, MME, which handover request message comprises a request for handover from the source network to the target network.

24. The method according to claim 22, further comprising:
receiving a handover response message from a target Mobility Management Entity (MME), which handover request response message comprises information about an allocation of the first number existing bearers and a third number of extra bearers.

25. The method according to claim 24, wherein the allocation of the third number of extra bearers is a pre-allocation of the third number of extra bearers in the target network.

26. The method according to claim 22, wherein the source network is a Circuit Switched, CS, network and the target network is a Packet Switched, PS, network; or wherein the source network is a PS network and the target network is a CS network.

27. The method according to claim 22, wherein the handover is a Serving Radio Network Subsystem, SRNS, relocation or a Reverse Single Radio Voice Call Continuity, rSRVCC, handover or an Inter Radio Access Technology HandOver, IRAT HO.

28. The method according to claim 22, wherein a communication service to be handover from the source network to the target network comprises at least one of a voice service and a video service.

29. The method according to claim 22, wherein the source network node is a Mobile Switching Centre, MSC, or a source Serving General Packet Radio Services Support Node, SGSN.

30. A target Mobility Management Entity, MME, for allocating bearers in a target network, which target MME is comprised in the target network and which target network comprises a first number of existing bearers, the target MME comprises:
  a transmitter configured to, when a second number of required bearers is larger than the first number of existing bearers in the target network, transmit an allocation request message to a target base station, which allocation request message comprises a request for allocation of the first number of existing bearers and a request for allocation of a third number of extra bearers in the target network.

31. The target MME according to claim 30, further comprising:
  a processor configured to determine the second number of required bearers in the target network for handover from a source network to the target network.

32. The target MME according to claim 30, further comprising:
  a receiver configured to receive, from a source network node, the second number of required bearers in the target network for handover from a source network to the target network.

33. The target MME according to claim 30, further comprising:
  a receiver configured to receive a handover request message from a source network node, which handover request message comprises a request for handover from a source network to the target network.

34. The target MME according to claim 33, wherein the receiver is further configured to
  receive an allocation response message from the target base station, which allocation response message comprises information about the allocation of the first number of existing bearers and allocation of the third number of extra bearers; and wherein the transmitter is further configured to transmit a handover response message to a source network node, which handover response message comprises information about the allocation of the first number of existing bearers and the third number of extra bearers.

35. The target MME according to claim 30, further comprising:
  a processor configured to compare the second number of required bearers with the first number of existing bearers.

36. The target MME according to claim 30, wherein the allocation request message is transmitted to the target base station when the second number of required bearers is larger than the first number of existing bearers in the target network and when the second number of required bearers is lower than a fourth number of available bearers in the target network.

37. The target MME according to claim 30, further comprising:
  a processor configured to, when the second number of required bearers is higher than a fourth number of available bearers in the target network, interrupt a handover from a source network to the target network.

38. The target MME according to claim 37, further comprising
  a transmitter configured to transmit information about the interruption of the handover to the source network node.

39. The target MME according to claim 30, wherein the request for allocation of a third number of extra bearers in the target network is a request for pre-allocation of the third number of extra bearers in the target network.

40. The target MME according to claim 37, wherein the source network is a Circuit Switched, CS, network and the target network is a Packet Switched, PS, network; or wherein the source network is a PS network and the target network is a CS network.

41. The target MME according to claim 30, wherein the source network node is a Mobile Switching Centre, MSC, or a source Serving General Packet Radio Services Support Node, SGSN.

42. The target MME according to claim 30, wherein the handover is a Serving Radio Network Subsystem, SRNS, relocation or a Reverse Single Radio Voice Call Continuity, rSRVCC, handover or an Inter Radio Access Technology HandOver, IRAT HO.

43. The target MME according to claim 30, wherein a communication service to be handover from the source network to the target network comprises at least one of a voice service and a video service.

44. A target base station for allocating bearers in a target network, which target base station is comprised in the target network and which target network comprises a first number of existing bearers, the target base station comprising:
  a receiver configured to, when a second number of required bearers is larger than the first number of existing bearers in the target network, receive an allocation request message from a target Mobility Management Entity, MME, which allocation request message comprises a request for allocation of the first number of existing bearers and a request for allocation of a third number of extra bearers in the target network; and
  a processor configured to:
  allocate the first number of existing bearers; and to
  allocate the third number of extra bearers.

45. The target base station according to claim 44, further comprising:
  a transmitter configured to transmit an allocation response message to the target MME, which allocation response message comprises information about the allocation of the first number of existing bearers and the third number of extra bearers.

46. The target base station according to claim 44, wherein the processor is further configured to allocate the third number of extra bearers in a non-user equipment specific pool or a user equipment specific pool.

47. The target base station according to claim 44, wherein the allocation of the third number of extra bearers is a pre-allocation of the third number of extra bearers in the target network.

48. The target base station according to claim 44, wherein the source network is a Circuit Switched, CS, network and the target network is a Packet Switched, PS, network; or wherein the source network is a PS network and the target network is a CS network.

49. The target base station according to claim 44, wherein the handover is a Serving Radio Network Subsystem, SRNS, relocation or a Reverse Single Radio Voice Call Continuity, rSRVCC, handover or an Inter Radio Access Technology HandOver, IRAT HO.

50. The target base station according to claim 44, wherein a communication service to be handover from the source network to the target network comprises at least one of a voice service and a video service.

51. A source network node for allocating bearers in a target network, which source network node is comprised in the source network and which target network comprises a first number of existing bearers, the source network node comprising:

a processor configured to determine a second number of required bearers in the target network for handover from the source network to the target network.

52. The source network node according to claim 51, further comprising:
a transmitter configured to transmit a handover request message to a target Mobility Management Entity, MME, which handover request message comprises a request for handover from the source network to the target network.

53. The source network node according to claim 51, further comprising:
a receiver configured to receive a handover response message from a target Mobility Management Entity, MME, which handover request response message comprises information about an allocation of the first number existing bearers and a third number of extra bearers.

54. The source network node according to claim 53, wherein the allocation of the third number of extra bearers is a pre-allocation of the third number of extra bearers in the target network.

55. The source network node according to claim 51, wherein the source network is a Circuit Switched, CS, network and the target network is a Packet Switched, PS, network; or wherein the source network is a PS network and the target network is a CS network.

56. The source network node according to claim 51, wherein the handover is a Serving Radio Network Subsystem, SRNS, relocation or a Reverse Single Radio Voice Call Continuity, rSRVCC, handover or an Inter Radio Access Technology HandOver, IRAT HO.

57. The source network node according to claim 51, wherein a communication service to be handover from the source network to the target network comprises at least one of a voice service and a video service.

58. The source network node according to claim 51, wherein the source network node is a Mobile Switching Centre, MSC, or a source Serving General Packet Radio Services Support Node, SGSN.

* * * * *